United States Patent [19]

Nakai et al.

[11] Patent Number: 5,034,053
[45] Date of Patent: Jul. 23, 1991

[54] HARD SINTERED COMPACT FOR TOOLS

[75] Inventors: Tetsuo Nakai; Mitsuhiro Goto, both of Hyogo, Japan

[73] Assignee: Sumitomo Electric Industries, Ltd., Osaka, Japan

[21] Appl. No.: 616,599

[22] Filed: Nov. 21, 1990

[30] Foreign Application Priority Data

Nov. 27, 1989 [JP] Japan .................. 1-307264
Nov. 30, 1989 [JP] Japan .................. 1-311569

[51] Int. Cl.$^5$ ............................. C22C 29/04
[52] U.S. Cl. .................... 75/238; 75/239; 75/240; 75/249; 419/45
[58] Field of Search ........... 75/238, 239, 240, 249; 419/45

[56] References Cited

U.S. PATENT DOCUMENTS

| | | | |
|---|---|---|---|
| 4,334,928 | 6/1982 | Hara et al. | 75/238 |
| 4,342,595 | 8/1982 | Bourdeau | 75/238 |
| 4,343,651 | 8/1982 | Yazu et al. | 75/238 |
| 4,647,546 | 3/1987 | Hall, Jr. et al. | 501/96 |
| 4,693,746 | 9/1987 | Nakai et al. | 75/238 |
| 4,911,756 | 3/1990 | Nakai et al. | 75/238 |

FOREIGN PATENT DOCUMENTS 57-3631   1/1982   Japan .
62-228450 10/1987  Japan .

Primary Examiner—Brooks H. Hunt
Assistant Examiner—Leon Nigohosian, Jr.
Attorney, Agent, or Firm—W. G. Fasse; D. H. Kane, Jr.

[57] ABSTRACT

A hard sintered compact for tools is a sintered compact obtained by super-high pressure sintering of 45–75% by vol. of cubic boron nitride powder and the remaining proportion of binder powder. The binder includes 5–25% by wt. of Al and the remaining proportion of at least one species of compounds represented by $(Hf_{1-z}M_z)$ C, where M denotes elements of IVa, Va and VIa groups in a periodic table except for Hf, and $0 \leq z \leq 0.3$ is satisfied. Because of this composition, improvements are made in strength, wear resistance and heat resisting property of the binder, and a hard sintered compact for tools having excellent strength and excellent wear resistance can be obtained.

12 Claims, No Drawings

HARD SINTERED COMPACT FOR TOOLS

FIELD OF THE INVENTION

The present invention relates generally to hard sintered compacts for tools employing cubic boron nitrides (hereinafter referred to as "cBN") and, more particularly, to a hard sintered compact for tools having enhanced strength and wear resistance with improvements of a binder.

DESCRIPTION OF THE BACKGROUND ART cBN is the hardest material next to diamond, and a sintered compact of cBN is employed for various cutting tools.

As one example of cBN sintered compacts suitable for cutting tools, Japanese Patent Publication No. 57-3631 (corresponding U.S. Pat. No. 4,334,928) discloses a hard sintered compact for tools, containing 80–40% by vol. of cBN and the remaining proportion of carbide, nitride, boride and silicide of elements selected from groups of the IVa, Va and VIa periodic table, mixtures thereof or counter solid solution compounds as principal components. These compounds constitute a continuous bound phase in the texture of the sintered compact. This sintered compact exhibits high performance in general as a material for cutting tools; however, it has a disadvantage that the cutting edge of the cutting tool is liable to be damaged due to insufficient strength and abrasion of the cutting edge when subjected to a considerably strong impact, for example, in the application for a continuous cutting of a highly hardened steel.

An improved hard sintered compact for tools, in which the strength and wear resistance of a cutting edge made of the sintered compact is improved in order to eliminate the damage of the cutting edge, is disclosed in Japanese Patent Laying-Open No. 62-228450. In this sintered compact, a binder includes 25–50% by wt. of Al, a compound containing Ti such as carbide of Ti, and 4–40% by wt. of W contained in the compound containing Ti or contained as WC. These components react with cBN in sintering, to produce aluminum boride, titanium boride and the like, which serve to firmly bond the binder and cBN or another binder.

U.S. Pat. No. 4,911,756 discloses a hard sintered compact for tools, including 50–75% by vol. of cBN and 25–50% by vol. of a binder containing 20–50% by wt. of aluminum, carbon nitride titanium and the like and 4–40% by wt. of tungsten.

Even the sintered compacts disclosed in the above-described Japanese Patent Publication No. 57-3631, Japanese Patent Laying-Open No. 62-228450 and U.S. Pat. No. 4,911,756 have, however, the following disadvantages when used for tools for cutting a cast iron. In cutting of a graphite cast iron and fast cutting of a gray cast iron, for example, abrasion of the cutting edge abruptly proceeds, so that the life of the cutting edge is shortened. Further, crater abrasion occurs in the cutting edge, so that the cutting edge is damaged. These problems still remain unsolved.

SUMMARY OF THE INVENTION

An object of the present invention is to provide a hard sintered compact for tools having excellent strength and wear resistance and exhibiting an excellent cutting performance even for a cast iron.

In order to accomplish the above object, a hard sintered compact for tools according to the present invention is a sintered compact obtained by super-high pressure sintering of 45–75% by vol. of cBN powder and the remaining proportion being formed as a binder from a binder powder. The binder contains 5–25% by wt. of Al; and the remaining proportion of at least one species of compounds represented by $(Hf_{1-z} M_z) C$, where M denotes elements of groups IVa, Va and VIa other than Hf in the periodic table, and $0 \leq z \leq 0.3$ is satisfied. In this specification the designation of groups IVa, Va, and VIa of the periodic table corresponds to the conventional U.S. designation of groups IVb, Vb, and VIb in the periodic table.

In accordance with the present invention, since the binder includes 5–25% by wt. of Al and the remaining proportion of $(Hf_{1-z} M_z) C$ compound as shown in the foregoing composition, these components react with cBN in the sintering under high-temperature and high-pressure, to produce aluminum boride ($AlB_2$), aluminum nitride (AlN), hafnium boride ($HfB_2$) or titanium boride ($TiB_2$). Alternatively, Al and the $(Hf_{1-z} M_z) C$ compound react with each other. These reaction products firmly couple cBN having an excellent resisting property to abrasion and the binder, or the binder and another binder. This results in a sintered compact having excellent strength and excellent wear resistance.

It is confirmed by X-ray diffraction that a slight amount of Al exist also as aluminum oxide in the sintered compact; however, the existing Al does not affect the action and effects of the present invention.

The $(Hf_{1-z} M_z) C$ compound such as HfC and a reaction product such as $HfB_2$ can provide sufficient resisting properties to heat and oxidation when the temperature of the cutting edge becomes higher by cutting of a cast iron or the like. These compounds and reaction products have excellent wear resistance and excellent strength under high temperature and can enhance the strength, wear resistance, heat resisting properties, etc. of the binder per se.

When the content of Al in the binder is less than 5% by wt., the retention of cBN by the binder decreases due to an insufficient reaction between Al and cBN. When the Al content exceeds 25% by wt., $AlB_2$ or the like increases, and the bonding strength between cBN and the binder increases. The relative content of the $(Hf_{1-z} M_z) C$ compound such as HfC having superior wear resistance to that of $AlB_2$ or the like, however, decreases. Accordingly, the hardness of the binder per se decreases, and hence the sintered compact fails to obtain sufficient wear resistance for the cast iron cutting and the like.

As compounds represented by the formula $(Hf_{1-z} M_z) C$ in the binder, there are many kinds of carbides containing Ti, Mo, W, etc. together with Hf in the case of $0 < z$ as well as HfC in the case of $z = 0$. Carbide containing Ti or W is especially preferable because it serves to reduce the wear resistance and the strength of the binder and to exhibit good characteristics. When z exceeds 0.3 in the foregoing formula, however, the content of HfC having relatively excellent wear resistance decreases. Thus, z is set to 0.3 or less.

Further, adding at least one species of iron group elements in the binder causes the strength and hardness of the binder to further increase, resulting in further improvements of the characteristics of the sintered compact. This is because an enhanced wetness between the iron group elements and borides such as $HfB_2$ and AlB$_2$ causes the binder to firmly couple or bond the borides.

When the amount of cBN in the sintered compact is less than 45% by vol., the strength and hardness of the sintered compact decreases. In addition, as the number of binders relatively increases, mechanical abrasion advances rapidly by, for example, a hard graphite contained in a cast iron and hard portions of a pearlite base in matrix, a base subjected to austempering and the like. Also, a crack is liable to occur due to an applied impact. When the amount of cBN in the sintered compact exceeds 75% by vol., cBN makes contact with another cBN. Thus, in the case of a strong member to be cut or an interrupted cutting in which high pressure is applied to a cutting edge, a crack is produced in contact portion between particles, and the number of binders relatively decreases. This results in a reduction in bonding strength between the binders and cBN and thus a reduction in strength of the sintered compact.

In abrasion of a general cBN sintered compact, it is considered that since cBN has excellent wear resistance, the binder is abraded first, whereby cBN drops out of the compact. Therefore, the particle size of cBN is preferably controlled as follows in order to make uniform the texture of the compact and to inhibit a premature abrasion of the binder. The average particle size of cBN is preferably smaller. When the particle size exceeds 4 μm in particular, a binder portion becomes larger and abraded with priority. Accordingly, the average particle size of cBN is preferably 4 μm or less. More preferably, if the particle size of cBN is controlled so that cBN of 1 μm or less in particle size may be 35-80% by wt. and that cBN of 3-6 μm in grain size may be 20-65% by wt., smaller cBN particles fill among larger cBN particles, so that the microstructure becomes homogeneous.

It is preferable in view of enhancement of wear resistance to employ micro binder powder having an average size smaller than ⅓ that of cBN because such micro binder powder advances uniform distribution of the binders.

According to another aspect, a hard sintered compact for tools in accordance with the present invention is a sintered compact obtained by super-high pressure sintering of 45-75% by vol. of cubic boron nitride powder and contains the remaining proportion of binder powder. The binder contains 4-20% by wt. of Al and 5-20% by wt. of Hf and contains the remaining proportion of HfC and a compound represented by $(Ti_{l-x} M_x) C_z$, (where M denotes elements of IVa, Va and VIa groups except for Hf in the periodic table; and $0 \leq x \leq 0.15$, $0.55 \leq z \leq 0.9$ are satisfied in the range of volume ratio 9:1-1:2.

With this composition, since the binder contains 4-20% by wt. of Al and 5-20% by wt. of Hf, and HfC and the above $(Ti_{l-x} M_x) C_z$ compound, these components react with cBN in sintering under high-temperature high-pressure, to produce aluminum boride (AlB$_2$), aluminum nitride (AlN), and hafnium boride (HfB$_2$) or titanium boride (TiB$_2$). Further, Al reacts with HfC or the $(Ti_{l-x} M_x) C_z$ compound. These reaction products firmly couple cBN having excellent wear resistance and the binder, or alternatively the binders. Therefore, a sintered compact superior in its strength and wear resistance can be obtained. The HfC and the $(Ti_{l-x} M_x) C_z$ compound along with those reaction products can provide sufficient resistance to heat and oxidation when the temperature of the cutting edge becomes higher in cast iron cutting or the like, as has been already described. Since those reaction products and compound have excellent wear resistance and excellent strength under high temperature, the strength, wear resistance, heat resistance, etc. of the binder per se can be enhanced.

When the content of Al in the binder is less than 4% by wt., the reaction between Al and cBN becomes insufficient. When the content of Hf is less than 5% by wt., the reaction between Hf and Al or $(Ti_{l-x} M_x) C_z$ becomes insufficient. In both cases, the retention of cBN by the binder decreases. Conversely, when the content of Al or Hf exceeds 20% by wt., a larger amount of AlB$_2$, HfB$_2$ or the like is produced, resulting in increased bonding strength of cBN and the binder. Since the relative content of HfC and the $(Ti_{l-x} M_x) C_z$ compound having superior wear resistance to that of AlB$_2$ and HfB$_2$ decreases, however, the hardness of the binder per se and the wear resistance of the sintered compact decrease.

The reason why the volume ratio of HfC to the $(Ti_{l-x} M_x) C_z$ compound in the binder is limited in the volume range of 9:1-1:2 is given below. First, when the amount of HfC relatively increases exceeding 9:1, Al in the binder still exceeds in amount even if reacting with HfC or the $(Ti_{l-x} M_x) C_z$ compound. Thus, the excess Al remains unreacting, to degrade the wear resistance. Conversely, when the $(Ti_{l-x} M_x) C_z$ compound relatively increases in amount exceeding 1:2, the reaction between HfC and the $(Ti_{l-x} M_x) C_z$ compound becomes supersaturation, and thus Hf remains as a metal component, to degrade the wear resistance.

In the formula $(Ti_{l-x} M_x) C_z$, $x=0$, i.e., the state where M is not included may be satisfied. When x exceeds 0.15, the amount of TiC having excellent resistance to heat and abrasion relatively decreases, and the wear resistance and the strength under high temperature also decrease, resulting in an inadequate material for tools. The reason why the relation $0.55 \leq z \leq 0.9$ is satisfied is that when z is less than 0.55, the amount of free Ti increases, and the strength and hardness of the binder per se decreases, whereas when z exceeds 0.9, the free Ti becomes insufficient in amount, and the bonding force of the binder decreases. If W is employed as M, the wear resistance and strength of the binder improves and exhibits good characteristics.

The reason why at least one species of iron group elements is added in the binder and why the amount of cBN in the sintered compact is set to 45-75% by vol. are given in the foregoing description.

DESCRIPTION OF THE PREFERRED EMBODIMENTS

Embodiment 1

Carbide containing Hf and Al powder are ground and mixed by employing a superhard alloy pot and bowl, to produce binder powder of 0.9 μm or less in average particle size having such composition as shown in Table 1 below. The produced binder powder and cBN powder of 2.5-4 μm in average particle size are mixed in the volume ratio of 42:58. The mixed powder are then put in a Mo container, heated in a vacuum furnace at $10^{-4}$ torr, 1000° C. for 20 minutes and then deaired. Thereafter, the resultant powder is sintered under the pressure of 55Kb, at the temperature of 1400° C. for 25 minutes.

When each of the resulting sintered compacts is identified by X-ray diffraction, the peak of cBN, that of the carbide containing Hf and those of HfB$_2$, AlB$_2$ and AlN are confirmed with respect to all the sintered compacts. The peaks of carbides including Ti, Mo and W other than Hf are also confirmed from samples. In addition, when the texture of the sintered compacts is observed by a scanning electron microscope, it is confirmed that cBN particles are mutually bonded by binders.

Furthermore, each sintered compact is processed to be an insert for cutting and undergoes a cutting test of a nodular cast iron FCD 45 member (hardness $H_B=200$). The test is carried out on conditions of 280 m/min in cutting speed, 0.25 mm in depth of cut, 0.22 mm/rev in feed rate and 20 minutes in cutting time by dry process. Table 1 shows the result of the test.

TABLE 1

| Sample No. | Binder Composition (% by wt.) | Abrasion width of Relief Plane (mm) |
|---|---|---|
| 1 | HfC:95, Al:5 | 0.059 |
| 2 | HfC:90, Al:10 | 0.042 |
| 3 | $(Hf_{0.7}Ti_{0.3})$C:80, Al:20 | 0.055 |
| 4 | HfC:75, Al:25 | 0.072 |
| 5 | $(Hf_{0.95}Mo_{0.05})$C:88, Al:12 | 0.047 |
| 6 | $(Hf_{0.95}Mo_{0.05})$C:92, Al:8 | 0.055 |
| 7 | $(Hf_{0.9}Ti_{0.1})$C:85, Al:15 | 0.037 |
| 8* | HfC:97, Al 3 | 0.098 |
| 9* | HfC:72, Al:28 | 0.110 |
| 10* | $(Hf_{0.65}Mo_{0.35})$C:75, Al:25 | 0.127 |
| 11* | $(Hf_{0.9}Ti_{0.1})$C:70, Al:30 | 0.154 |
| 12* | $(Hf_{0.6}V_{0.4})$C:90, Al:10 | 0.108 |

Embodiment 2

HFC powder of 89% by wt. and Al powder of 11% by wt. are ground and mixed in the same manner as embodiment 1, to produce binder powder having average particle size shown in Table 2 below. The produced binder powder is mixed with cBN powder shown in table 2, deaired as in embodiment 1 and then sintered under the pressure of 45 Kb, at the temperature of 1300° C. for 20 minutes, thereby to obtain sintered compacts.

Each of the sintered compacts is processed to be an insert for cutting. Then, the end surface of a cylinder of a ductile cast iron FCD 70 member (hardness $H_B=290$) is cut by dry process at 180 m/min in cutting speed, 0.2 mm in depth of cut and 0.17 mm/rev in feed rate. The cutting time during which the abrasion width of a relief plane reaches 0.2 mm is measured. The result of the test is shown in Table 2.

TABLE 2

| Sample | Average Particle Size of Binder (μm) | Amount of cBN (vol %) | Distribution of cBN Particle Size (μm:%) | Average Particle Size of cBN (μm) | Cutting Time (min) |
|---|---|---|---|---|---|
| 13 | 0.3 | 45 | 0-1:35 / 2-4:45 / 4-8:20 | 3.6 | 34 |
| 14 | 0.4 | 55 | 0-1:40 / 1-2:25 / 3-6:35 | 2.3 | 40 |
| 15 | 0.5 | 65 | 0-1:40 / 3-6:60 | 3.8 | 38 |
| 16 | 0.2 | 75 | 0-1:75 / 3-6:25 | 2.2 | 33 |
| 17 | 0.4 | 60 | 0-1:45 / 3-6:55 | 3.1 | 45 |
| 18 | 0.4 | 58 | 0-2:80 / 3-6:20 | 2.1 | 58 |
| 19 | 0.3 | 50 | 0-1:40 / 1-2:30 / 3-6:30 | 1.9 | 51 |
| 20 | 0.3 | 70 | 0-2:65 / 2-4:35 | 2.8 | 47 |
| 21 | 1.5 | 65 | 0-1:32 / 3-6:68 | 4.0 | 27 |
| 22 | 1.4 | 70 | 3-6:100 | 4.1 | 24 |
| 23 | 2.2 | 65 | 4-8:100 | 6.0 | 21 |
| 24* | 0.2 | 43 | 0-2:58 / 4-8:42 | 2.7 | Damaged in 6 min. |
| 25* | 0.4 | 78 | 0-1:50 / 4-8:50 | 3.0 | 7 |
| 26* | 1.3 | 40 | 2-4:100 | 3.1 | Damaged in 3 min. |

Embodiment 3

HfC powder, carbide powder containing Ti, Hf powder and Al powder are all ground and mixed together employing a superhard alloy pot and bowl, to produce binder powder of 0.8 μm or less in average particle size having a composition shown in Table 3 below. The produced binder powder and cBN powder of 2.5-4 μm in average particle size are mixed in the volume ratio of 50:50. The mixed powder is put in a Mo container, heated in a vacuum furnace at $10^{-4}$ torr, 100° C. for 20 minutes and then deaired. The resultant powder is then sintered under the pressure of 55 Kb and at the temperature of 1400° C. for 30 minutes.

TABLE 3

| Sample No. | Binder Composition (% by wt.) |
|---|---|
| 27 | HfC:87, $TiC_{0.6}$:4, Al:4, Hf:5 |
| 28 | HfC:64, $(Ti_{0.9}W_{0.1})C_{0.55}$:6, Al:10, Hf:20 |
| 29 | HfC:72, $TiC_{0.9}$:14, Al:7, Hf:7 |
| 30 | HfC:46, $TiC_{0.7}$:36, Al:12, Hf:6 |
| 31 | HfC:41.5, $(Ti_{0.95}Mo_{0.05})$ $C_{0.8}$:32.5 Al:20, Hf:6 |
| 32 | HfC:75, $TiC_{0.85}$:6, Al:9, Hf:10 |
| 33 | HfC:63.6, $TiC_{0.75}$:12.4, Al:15, Hf:9 |
| 34 | HfC:75, $(Ti_{0.95}W_{0.05})C_{0.6}$:10, Al:9 Hf:6 |
| 35* | HfC:89.6, $TiC_{0.7}$:8.4, Al:2 |
| 36* | HfC:67.9, $(Ti_{0.95}W_{0.05})C_{0.8}$:3.1 Al:22, Hf:7 |
| 37* | HfC:32, $TiC_{0.89}$:38, Al:10, Hf:20 |
| 38* | HfC:72.2, $TiC_{0.55}$:2.8, Al:20, Hf:5 |
| 39* | HfC:18.4, $(Ti_{0.95}Mo_{0.05})C_{0.7}$:71.6 Al:5, Hf:5 |
| 40* | HfC:45, $TiC_{0.4}$:35, Al:10, Hf:10 |
| 41* | HfC:41.5, $TiC_{0.95}$:32.5, Al:4, Hf:22 |

Each of the resultant sintered compacts is identified by X-ray diffraction. The peak of cBN, that of carbide including Hf, and those of $HfB_2$, $AlB_2$, AlN and $TiB_2$ are confirmed with respect to all the sintered compacts. The peaks of carbides of Mo, W other than Hf are also confirmed from samples. When the texture of the sintered compacts is observed by a scanning electron microscope, it is confirmed that cBN micro particles are mutually coupled by binders.

In addition, each sintered compact is processed to be a insert for cutting and undergoes a cutting test of a nodular graphite cast iron FCD 45 member (hardness $H_B=200$). This test is carried out on such conditions as 300 m/min in cutting speed, 0.3 mm in depth of cut, 0.2 mm/rev in feed rate and 20 min. in cutting time by dry process. The result of the test is shown in Table 4 below.

TABLE 4

| Sample | Abrasion Width of Relief Plane (mm) | Sample | Abrasion Width of Relief Plane (mm) |
|---|---|---|---|
| 27 | 0.073 | 35* | Damaged in its course. |
| 28 | 0.091 | 36* | 0.110 |
| 29 | 0.058 | 37* | 0.149 |
| 30 | 0.087 | 38* | 0.102 |
| 31 | 0.099 | 39* | 0.117 |
| 32 | 0.065 | 40* | 0.126 |
| 33 | 0.086 | 41* | 0.135 |
| 34 | 0.048 | | |

Embodiment 4

HfC powder of 73% by wt., $TiC_{0.75}$ powder of 12% by wt., Al powder of 10% by wt. and Hf powder of 5% by wt. are all ground and mixed together in the same manner as embodiment 1, to produce binder powder having average particle size shown in Table 5 below. The produced binder powder is mixed with cBN powder shown in Table 5 and deaired as in embodiment 1. The resultant powder is then sintered under the pressure of 50 Kb, at the temperature of 1300° C. for 30 minutes, thereby to obtain sintered compacts.

Each of the sintered compacts is processed to be a insert for cutting. The outer circumference of a cylinder of an austempered ductile cast iron FCD100 member (hardness $H_B=300$) is cut by dry process at the cutting speed of 150 m/min, depth of cut 0.15 mm and feed rate of 0.15 mm/rev. The cutting time during which the abrasion width of a relief plane reaches 0.3 mm is measured. The result of the test is shown in Table 5.

TABLE 5

| Sample | Average Particle Size of Binder (μm) | Amount of cBN (vol %) | Distribution of cBN Particle Size (μm:%) | Average Particle Size of cBN (μm) | Cutting Time (min) |
|---|---|---|---|---|---|
| 42 | 0.3 | 55 | 0-1:35<br>2-4:45<br>4-8:20 | 3.6 | 47 |
| 43 | 0.35 | 45 | 0-1:40<br>1-2:25<br>3-6:35 | 2.3 | 49 |
| 44 | 0.5 | 68 | 0-1:40<br>3-6:60 | 3.8 | 36 |
| 45 | 0.2 | 73 | 0-1:75<br>3-6:25 | 2.2 | 28 |
| 46 | 0.42 | 62 | 0-1:45<br>3-6:55 | 3.1 | 34 |
| 47 | 0.41 | 58 | 0-2:80<br>3-6:20 | 2.1 | 21 |
| 48 | 0.29 | 52 | 0-1:40<br>1-2:25<br>3-6:35 | 1.9 | 41 |
| 49 | 0.3 | 70 | 0-2:65<br>2-4:35 | 2.8 | 32 |
| 50 | 1.3 | 60 | 0-1:32<br>3-6:68 | 4.0 | 26 |
| 51 | 1.4 | 50 | 3-6:100 | 4.1 | 25 |
| 52 | 2.0 | 70 | 4-8:100 | 6.0 | 20 |
| 53* | 0.3 | 78 | 0-2:60<br>4-8:40 | 2.9 | 8 |
| 54* | 0.25 | 43 | 0-1:50<br>3-6:50 | 3.3 | Damaged in 6 min. |
| 55* | 1.5 | 78 | 2-4:30<br>3-6:70 | 4.2 | Damaged in 4 min. |

The foregoing and other objects, features, aspects and advantages of the present invention will become more apparent from the following detailed description of the present invention when taken in conjunction with the accompanying drawings.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A hard sintered compact for tools obtained by super-high pressure sintering of 45-75% by vol. of cubic boron nitride powder and a binder formed by a remaining proportion of a binder powder, said binder including 5-25% by wt. of Al and a remainder of at least one species of compounds represented by $(Hf_{1-z}M_z)C$, wherein M is an element selected from the group consisting of groups IVa, Va and VIa of the periodic table except for Hf, and wherein the condition $0 \leq z \leq 0.3$ is satisfied.

2. The hard sintered compact for tools in accordance with claim 1, wherein
said cubic boron nitride powder prior to sintering has an average particle size of 4 μm or less, and said sintered compact includes 35-80% by wt. of cubic boron nitride powder of 1 μm or less and 20-65% by wt. of cubic boron nitride powder of 3-6 μm in particle size prior to sintering.

3. The hard sintered compact for tools in accordance with claim 1, wherein
the average particle size of said binder prior to sintering is smaller than ⅓ of the average particle size of said cubic boron nitride powder prior to sintering.

4. The hard sintered compact for tools in accordance with claim 1, wherein said element M is selected from the group consisting of Ti, W and Mo.

5. The hard sintered compact for tools in accordance with claim 1, wherein said binder formed by said binder powder comprises a compound selected from the group consisting of $AlB_2$, AlN, $HfB_2$ and $TiB_2$.

6. The hard sintered compact for tools in accordance with claim 1, wherein said binder formed by said binder powder comprises a reaction product of Al and the $(Hf_{1-z}M_z)C$ compound.

7. A hard sintered compact for tools obtained by super-high pressure sintering of 45-75% by vol. of cubic boron nitride powder and a binder formed by a remaining proportion of a binder powder, said binder including 4-20% by wt. of Al, 5-20% by wt. of Hf, and a remainder of HfC and a compound represented by $(Ti_{1-x}M_x)C_z$ wherein M is an element selected from the group consisting of groups IVa, Va and VIa of the periodic table except for Hf, wherein the conditions $0 \leq x \leq 0.15$, $0.55 \geq z \leq 0.9$ are satisfied, and wherein the volume ratio of HfC to $(Ti_{1-x}M_x)C_z$ is in the range of 9:1 to 1:2.

8. The hard sintered compact for tools in accordance with claim 7, wherein the average particle size of the cubic boron nitride powder prior to sintering is 4 μm or less, and said sintered compact comprises 30-80% by wt. of cubic boron nitride powder of 1 μm or less in particle size, and 20-65% by wt. of cubic boron nitride powder of 3-6 μm in particle size prior to sintering.

9. The hard sintered compact for tools in accordance with claim 7, wherein the average particle size of said binder prior to sintering is smaller than ⅓ of the average particle size of said cubic boron nitride power prior to sintering.

10. The hard sintered compact for tools in accordance with claim 7, wherein said element M is selected from the group consisting of W and Mo.

11. The hard sintered compact for tools in accordance with claim 7, wherein said binder formed by said binder powder comprises a compound selected from the group consisting of $AlB_2$, $AlN$, $HfB_2$ and $TiB_2$.

12. The hard sintered compact for tools in accordance with claim 7, wherein said binder formed by said binder powder comprises a reaction product of Al and the $(Hf_{1-x} M_x) C_z$ compound.

* * * * *